(12) United States Patent
Cordatos et al.

(10) Patent No.: US 7,615,104 B2
(45) Date of Patent: Nov. 10, 2009

(54) FUEL DEOXYGENATION SYSTEM WITH MULTI-LAYER OXYGEN PERMEABLE MEMBRANE

(75) Inventors: Haralambos Cordatos, Colchester, CT (US); Louis J. Spadaccini, Manchester, CT (US); Ingo Pinnau, Palo Alto, CA (US)

(73) Assignees: United Technologies Corporation, Hartford, CT (US); Membrane Technology & Research, Inc., Menlo Park, CA (US)

( * ) Notice: Subject to any disclaimer, the term of this patent is extended or adjusted under 35 U.S.C. 154(b) by 498 days.

(21) Appl. No.: 11/265,845

(22) Filed: Nov. 3, 2005

(65) Prior Publication Data

US 2007/0095206 A1    May 3, 2007

(51) Int. Cl.
*B01D 53/22* (2006.01)

(52) U.S. Cl. ............................ 96/6; 96/7; 96/11; 96/12; 96/13; 96/14; 95/46; 95/54; 210/640; 210/650; 210/490; 210/500.21; 210/500.27

(58) Field of Classification Search .............. 96/6, 96/7, 11, 12, 13, 14; 95/45, 46, 54; 210/640, 210/650, 490, 500.21, 500.27
See application file for complete search history.

(56) References Cited

U.S. PATENT DOCUMENTS

| | | | |
|---|---|---|---|
| 4,371,385 A | 2/1983 | Johnson | |
| 4,516,984 A | 5/1985 | Warner et al. | |
| 4,602,923 A | 7/1986 | Bernstein | |
| 4,729,773 A | 3/1988 | Shirato et al. | |
| 4,955,992 A | 9/1990 | Goodale et al. | |
| 5,053,060 A | 10/1991 | Kopf-Sill et al. | |
| 5,078,755 A | 1/1992 | Tozawa et al. | |
| 5,123,937 A | 6/1992 | Shibata et al. | |
| 5,154,832 A | 10/1992 | Yamamura et al. | |
| 5,340,384 A | 8/1994 | Sims | |
| 5,410,052 A | 4/1995 | Smith et al. | |
| 5,482,860 A | 1/1996 | Copeland et al. | |
| 5,522,917 A | 6/1996 | Honda et al. | |
| 5,693,122 A | 12/1997 | Berndt | |
| 5,695,545 A | 12/1997 | Cho et al. | |
| 5,888,275 A | 3/1999 | Hamasaki et al. | |
| 5,902,382 A | 5/1999 | Campain et al. | |

(Continued)

FOREIGN PATENT DOCUMENTS

EP    0273267    7/1988

(Continued)

OTHER PUBLICATIONS

U.S. Patent Application entitled "Fuel Deoxygenation System With Flow Impingement Elements," filed Jan. 18, 2006.

(Continued)

*Primary Examiner*—Jason M Greene
(74) *Attorney, Agent, or Firm*—Carlson Gaskey & Olds PC

(57) ABSTRACT

A fuel system for an energy conversion device includes a deoxygenator system with an oxygen permeable membrane formed from a multiple of layers. The layers include a sealant layer, an oxygen permeability layer and a porous backing layer. The layered composite oxygen permeable membrane maximizes the oxygen transfer rate and minimizes the fuel leakage rate.

24 Claims, 6 Drawing Sheets

U.S. PATENT DOCUMENTS

| | | | |
|---|---|---|---|
| 5,902,747 A | 5/1999 | Nemser et al. | |
| 6,106,591 A | 8/2000 | Keskar et al. | |
| 6,168,648 B1 | 1/2001 | Ootani et al. | |
| 6,258,154 B1 | 7/2001 | Berndt et al. | |
| 6,309,444 B1 | 10/2001 | Sims et al. | |
| 6,315,815 B1 | 11/2001 | Spadaccini et al. | |
| 6,379,796 B1 | 4/2002 | Uenishi et al. | |
| 6,402,810 B1 | 6/2002 | Mayer et al. | |
| 6,402,818 B1 | 6/2002 | Sengupta | |
| 6,494,938 B2 | 12/2002 | Sims et al. | |
| 6,540,813 B2 * | 4/2003 | Nelson et al. | 95/54 |
| 6,616,841 B2 | 9/2003 | Cho et al. | |
| 6,623,637 B1 | 9/2003 | Monzen et al. | |
| 6,682,016 B1 | 1/2004 | Peroulakis | |
| 6,709,492 B1 * | 3/2004 | Spadaccini et al. | 96/6 |
| 7,153,343 B2 * | 12/2006 | Burlatsky et al. | 95/46 |
| 7,329,305 B2 * | 2/2008 | Sloan | 95/46 |
| 2001/0035093 A1 | 11/2001 | Yokota | |
| 2002/0195385 A1 | 12/2002 | Cho et al. | |
| 2003/0116015 A1 | 6/2003 | Sengupta et al. | |
| 2003/0148164 A1 | 8/2003 | Koch et al. | |
| 2003/0151156 A1 | 8/2003 | Crumm et al. | |
| 2003/0161785 A1 | 8/2003 | Dieckmann | |
| 2003/0219637 A1 | 11/2003 | Coors | |
| 2004/0025696 A1 | 2/2004 | Varrin, Jr. et al. | |
| 2004/0028988 A1 | 2/2004 | Bunker | |
| 2004/0050786 A1 | 3/2004 | Dey et al. | |
| 2004/0094463 A1 | 5/2004 | Laverdiere et al. | |
| 2006/0278073 A1 * | 12/2006 | McHugh | 95/46 |

FOREIGN PATENT DOCUMENTS

| | | | |
|---|---|---|---|
| EP | 0354797 | | 2/1990 |
| EP | 0460512 | | 12/1991 |
| EP | 0493869 | | 7/1992 |
| EP | 0552090 | | 7/1993 |
| EP | 0576677 | | 1/1994 |
| EP | 0583748 | | 2/1994 |
| EP | 0622475 | | 11/1994 |
| EP | 0750322 | | 12/1996 |
| EP | 0963229 | | 8/1998 |
| EP | 09070738 | | 1/2000 |
| EP | 1018353 | | 7/2000 |
| EP | 1052011 | | 11/2000 |
| EP | 1210971 | | 6/2002 |
| EP | 1239189 | | 9/2002 |
| EP | 1270063 | | 1/2003 |
| EP | 1277504 | | 1/2003 |
| EP | 1 568 403 A1 * | | 8/2005 |
| EP | 1568403 A1 | | 8/2005 |
| EP | 1579901 A1 | | 9/2005 |
| JP | 63151307 | | 6/1988 |
| JP | 3169304 | | 7/1991 |
| JP | 3193106 | | 8/1991 |
| JP | 5084474 | | 4/1993 |
| JP | 5317605 | | 12/1993 |
| JP | 7080205 | | 3/1995 |
| JP | 7227504 | | 8/1995 |
| JP | 8000906 | | 1/1996 |
| JP | 8332306 | | 12/1996 |
| JP | 10174803 | | 6/1998 |
| JP | 10216404 | | 8/1998 |
| JP | 11009902 | | 1/1999 |
| JP | 11033373 | | 2/1999 |
| JP | 11244607 | | 9/1999 |
| JP | 2000051606 | | 2/2000 |
| JP | 2000084368 | | 3/2000 |
| JP | 20000140505 | | 5/2000 |
| JP | 20000262871 | | 9/2000 |
| JP | 2000288366 | | 10/2000 |
| JP | 2000350902 | | 12/2000 |
| JP | 2003010604 | | 1/2003 |
| JP | 2003062403 | | 3/2003 |
| JP | 2003200024 | | 7/2003 |
| JP | 2003245525 | | 9/2003 |
| WO | WO 94/16800 | | 8/1994 |
| WO | WO 97/02190 | | 1/1997 |
| WO | WO 98/35739 | * | 8/1998 |
| WO | WO98/35739 | | 8/1998 |
| WO | WO 99/39811 | | 8/1999 |
| WO | WO 00/44479 | | 8/2000 |
| WO | WO 00/44482 | | 8/2000 |
| WO | WO 03/029744 | | 4/2003 |
| WO | WO 03/036747 | | 5/2003 |
| WO | WO 03/080228 | | 10/2003 |
| WO | WO 03/086573 | | 10/2003 |
| WO | WO 2004/007060 | | 1/2004 |
| WO | WO 2004/041397 | | 5/2004 |

OTHER PUBLICATIONS

U.S. Patent Application entitled "Fuel Deoxygenation System With Non-Metallic Fuel Plate Assembly," filed Jan. 18, 2006.

U.S. Appl. No. 11/148,508, entitled "Fuel Deoxygenation System With Non-Planar Plate Members," filed Jun. 9, 2005.

U.S. Appl. No. 11/049,175, entitled "Fuel Deoxygenation System With Textured Oxygen Permeable Membrane," filed Feb. 2, 2005.

U.S. Patent Application entitled "Fuel Deoxygenator With Non-Planar Fuel Channel and Oxygen Permeable Membrane", filed Jan. 18, 2006.

Richard W. Baker, "Membrane Technology and Applications," 2nd Edition, John Wiley & Sons, Ltd., pp. 96-103.

Search Report EP 06 25 5609, dated Feb. 27, 2007.

* cited by examiner

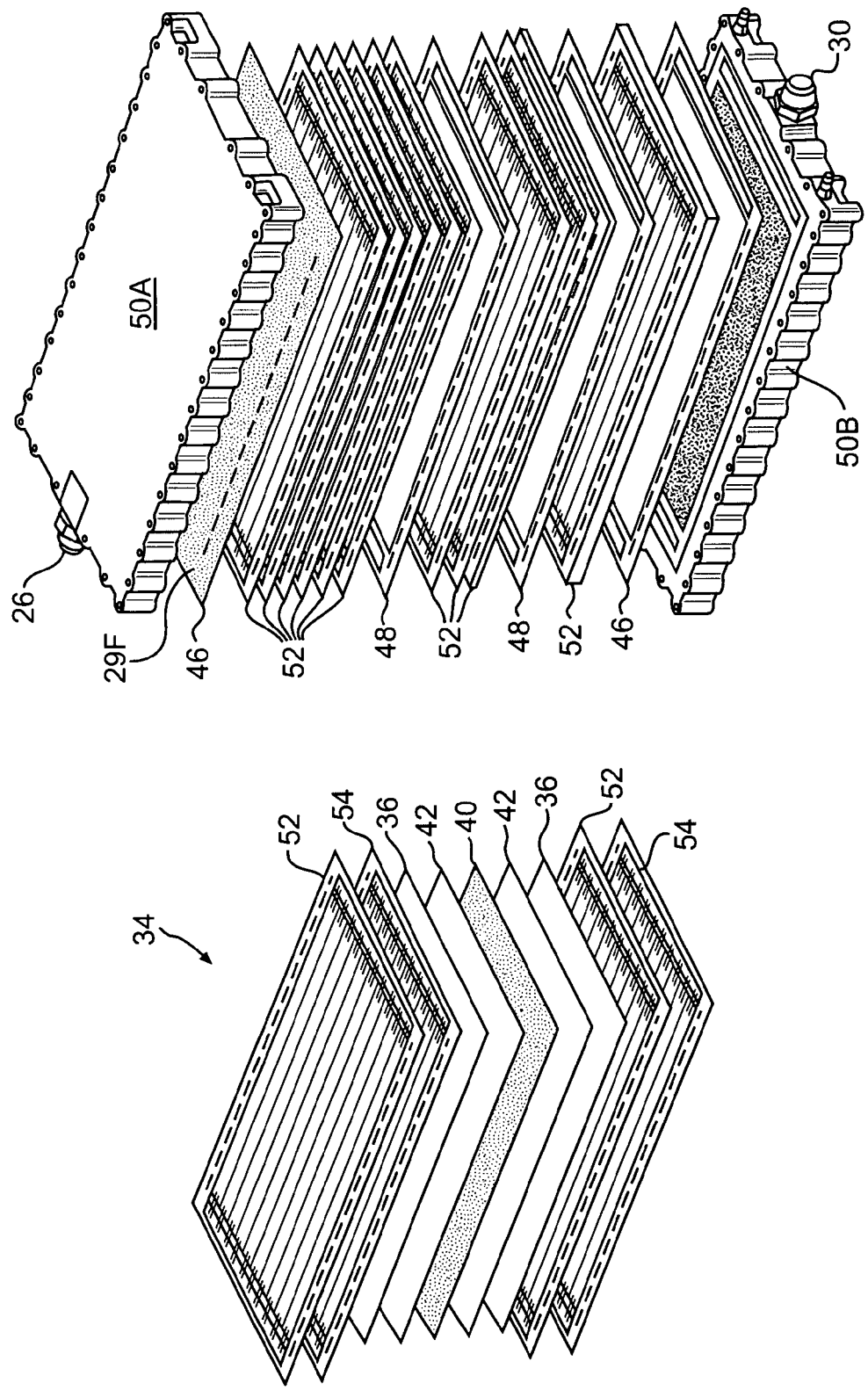

FUEL DEOXYGENATION SYSTEM WITH MULTI-LAYER OXYGEN PERMEABLE MEMBRANE

BACKGROUND OF THE INVENTION

The present invention relates to stabilizing fuel by deoxygenation, and more particularly to deoxygenation through a composite oxygen permeable membrane which minimizes fuel absorption.

Jet fuel is often utilized in aircraft as a coolant for various aircraft systems. The presence of dissolved oxygen in hydrocarbon jet fuels may be objectionable because the oxygen supports oxidation reactions that yield undesirable by-products. Dissolution of air in jet fuel results in an approximately 70 ppm oxygen concentration. When aerated fuel is heated between 350° F. and 850° F. the oxygen initiates free radical reactions of the fuel resulting in deposits commonly referred to as "coke" or "coking." Coke may be detrimental to the fuel lines and may inhibit combustion. The formation of such deposits may impair the normal functioning of a fuel system, either with respect to an intended heat exchange function or the efficient injection of fuel.

Various conventional fuel deoxygenation techniques are currently utilized to deoxygenate fuel. Typically, lowering the oxygen concentration to approximately 2 ppm is sufficient to overcome the coking problem.

One conventional Fuel Stabilization Unit (FSU) utilized in aircraft removes oxygen from jet fuel by producing an oxygen partial pressure gradient across an oxygen permeable membrane. The membrane is in contact with fuel flow and is supported on a porous backing plate such that oxygen may be extracted from the fuel.

Although quite effective, a very small amount of fuel may leak through the 6-12 angstrom-sized pores of the oxygen permeable membrane. The rate of fuel leakage is inversely proportional to the thickness of the membrane; however, the rate of oxygen removal is also inversely proportional to membrane thickness. Therefore, an increase in membrane thickness will reduce fuel leakages, but the increase will also proportionally reduce deoxygenation. However, minor fuel leakage may be detrimental in that, over a period of time, fuel may saturate the membrane, block the permeation of oxygen, and reduce deoxygenation efficiency thereof.

SUMMARY OF THE INVENTION

A fuel system for an energy conversion device according to the present invention includes a deoxygenator system with a composite oxygen permeable membrane formed from a multiple of material layers. The layers include a sealant layer, an oxygen permeability layer and a porous backing layer. The layered composite oxygen permeable membrane maximizes the oxygen transfer rate yet minimizes the fuel leakage rate.

Applicant has validated the composite oxygen permeable membrane of the present invention experimentally as compared to conventional single layer membranes. In particular, a TEFLON™ AF 1600/TEFLON™ AF 2400 composite oxygen permeable membrane as described within the present invention has a total thickness of approximately 2 microns and exhibited a 20% improvement in jet fuel deoxygenation with only approximately 1/10 of the fuel leakage rate compared to an approximately 4 micron thick TEFLON™ AF 2400 membrane with essentially no signs of performance degradation over 1000 hours of continuous operation. Similar performance improvement has been obtained using a HYFLON™ AD composite membrane.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2B is an exploded view of a deoxygenator system;

DETAILED DESCRIPTION OF THE PREFERRED EMBODIMENT

Figure 1:
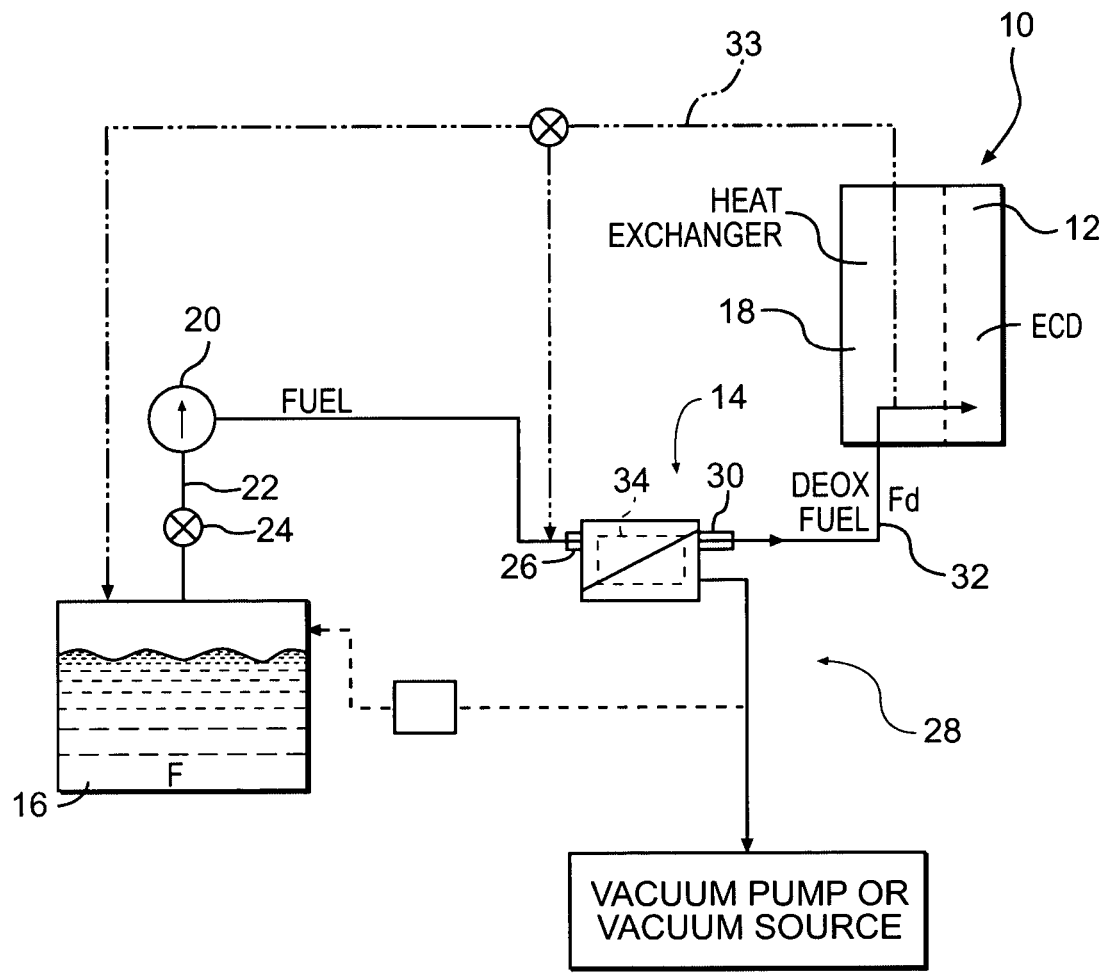
FIG. 1 is a general schematic block diagram of an energy conversion device (ECD) and an associated fuel system employing a fuel deoxygenator in accordance with the present invention.

FIG. 1 illustrates a general schematic view of a fuel system 10 for an energy conversion device (ECD) 12. A deoxygenator system 14 receives liquid fuel F from a reservoir 16 such as a fuel tank. The fuel F is typically a hydrocarbon such as jet fuel. The ECD 12 may exist in a variety of forms in which the fuel, at some point prior to eventual use for processing, for combustion, or for some form of energy release, acquires sufficient heat to support autoxidation reactions and coking if dissolved oxygen is present to any significant extent in the fuel.

One form of the ECD 12 is a gas turbine engine, and particularly such engines in aircraft. Typically, the fuel also serves as a coolant for one or more sub-systems in the aircraft and becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system 10. The heat exchange system 18 may alternatively or additionally include a multiple of heat exchanges distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by the fuel pump 20 assists in circulating the fuel F through the deoxygenator system 14 and other portions of the fuel system 10. As the fuel F passes through the deoxygenator system 14, oxygen is selectively removed into a vacuum or sweep gas system 28. The sweep gas can be any gas that is essentially free of oxygen.

The deoxygenated fuel Fd flows from a fuel outlet 30 of the deoxygenation system 14 via a deoxygenated fuel conduit 32, to the heat exchange system 18 and to the ECD 12 such as the fuel injectors of a gas turbine engine. A portion of the deoxygenated fuel may be recirculated, as represented by recirculation conduit 33 to either the deoxygenation system 14 and/ or the reservoir 16. It should be understood that although a particular component arrangement is disclosed in the illustrated embodiment, other arrangements will benefit from the instant invention.

Figure 2A:
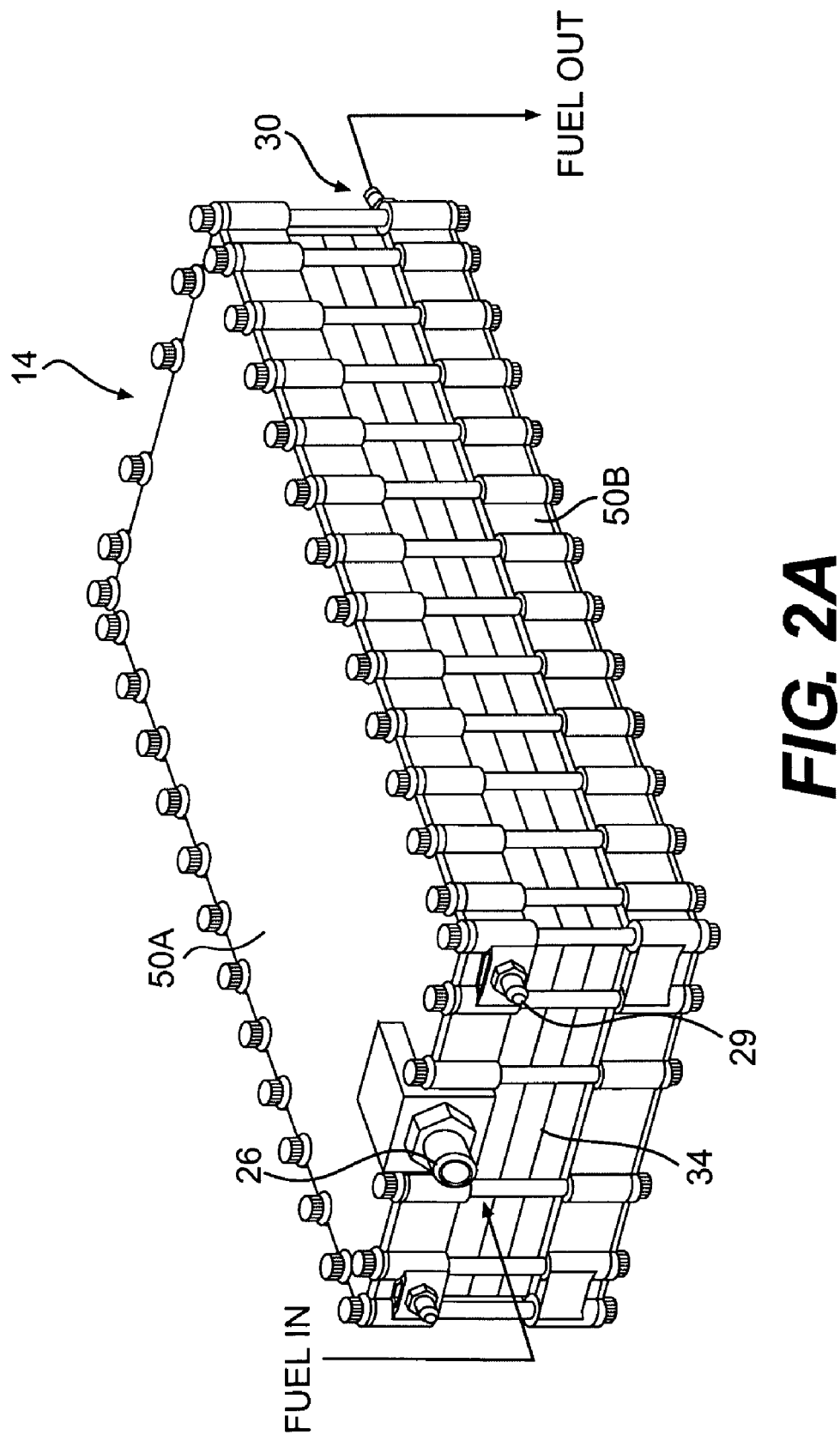
FIG. 2A is an expanded perspective view of a deoxygenator system.
Figure 3:
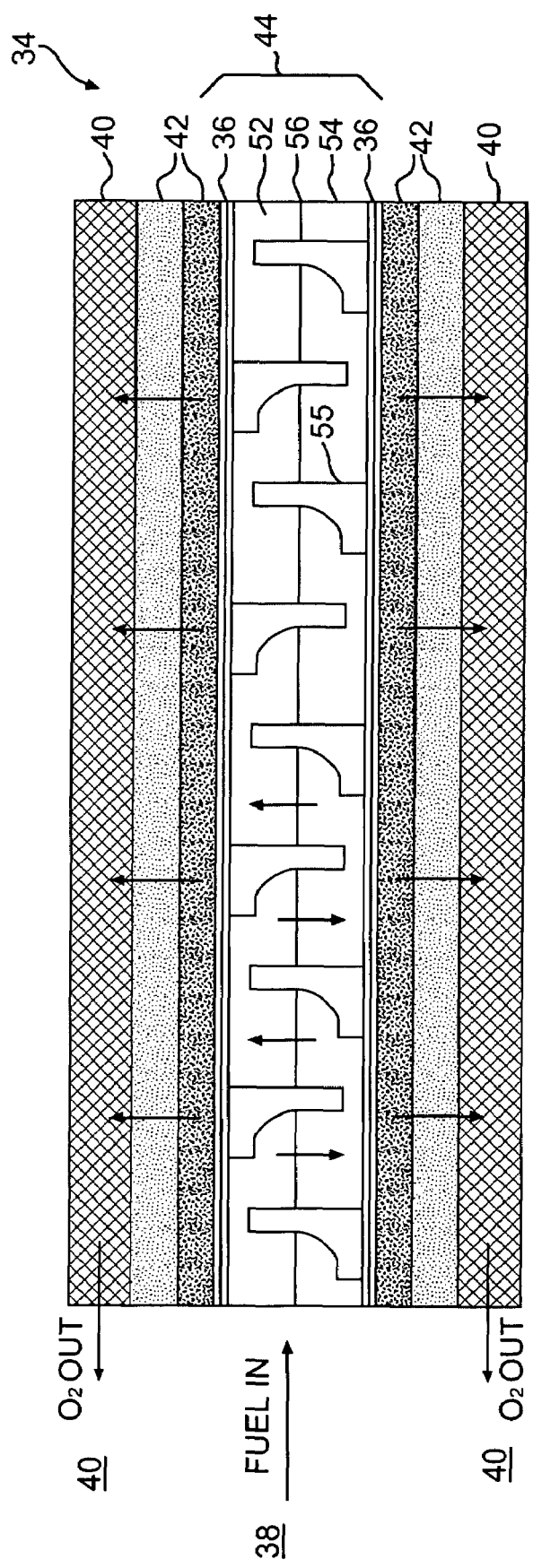
FIG. 3 is an expanded sectional view of a fuel plate assembly illustrating a fuel channel and an oxygen-receiving channel.

Referring to FIG. 2A, the deoxygenator system 14 preferably includes a multiplicity of gas/fuel micro-channel assemblies 34 (FIG. 2B). The assemblies 34 include a composite oxygen permeable membrane 36 between a fuel channel 38 and an oxygen receiving vacuum or sweep gas channel 40 which is preferably a mesh which permits the flow of nitrogen and/or another oxygen-free gas (FIG. 3). It should be understood that the channels may be of various shapes and arrangements to provide a pressure differential, which maintains an oxygen concentration differential across the membrane to deoxygenate the fuel.

The composite oxygen permeable membrane 36 preferably includes oxygen permeable membranes, which allow dissolved oxygen (and other gases) to diffuse through angstrom-size voids but exclude the larger fuel molecules, and permeable membranes which use a solution-diffusion mechanism to dissolve the oxygen (and/or other gases) and allow it (or them) to diffuse through the membrane, while excluding the fuel. The family of TEFLON™ AF which is an amorphous copolymer of perfluoro-2,2-dimethyl-1,3-dioxole (PDD) often identified under the trademark "TEFLON™ AF" registered to E. I. DuPont de Nemours of Wilmington, Del., and the family of HYFLON™ AD which is a copolymer of 2,2,4-trifluoro-5-trifluoromethoxy-1,3-dioxole (TTD) registered to Solvay Solexis, Milan, Italy have proven to provide effective results for fuel deoxygenation. The TEFLON™ AF 2400 and/or TEFLON™ AF 1600 material is believed to use a solution-diffusion mechanism.

Referring to FIG. 2B, one set of plates, which forms one micro-channel assembly 34 of the deoxygenator system 14, includes a fuel plate assembly 44 sandwiched adjacent to the composite oxygen permeable membranes 36 which are supported by a porous support 42 such as non-woven polyester. It should be understood that the porous substrate, although schematically illustrated, may take various forms. Adjacent one or more assembly 34 is a separator plate 48. The separator plate 48 prevents fuel from leaking across the predefined fuel passages defined by the fuel plate assemblies 34. The deoxygenation system 14, irrespective of the number of micro-channel assemblies 34, is sealed by an interface plate 46 and an outer housing plate 50a, 50b, which respectively include the fuel inlet 26, the vacuum port 29, and the fuel outlet 30 (also illustrated in FIG. 2A). The outer housing plates 50a, 50b are preferably attached together through a multitude of fasteners such as bolts or the like such that the micro-channel assemblies 34 are sandwiched therebetween. The outer housing plates 50a, 50b are preferably relatively rigid components which compress the micro-channel assemblies 34 such that sealing between plates are maintained thereby. Although illustrated as rectilinear in the illustrated embodiment, one of ordinary skill in the art will recognize that alternative shapes, sizes, or configurations are suitable and within the scope of the invention.

Each fuel plate assembly 44 defines a portion of the fuel channel 38 between the inlet 26 and outlet 28. The vacuum port 29 (FIG. 2A) is in communication with a vacuum port 29f (FIG. 2B) through the interface plate 46 and the porous support 42. Vacuum creates a partial pressure gradient within each of the porous supports 42 to extract dissolved oxygen and other dissolved gases from the fuel channel 38 through the composite oxygen permeable membrane 36. The oxygen is expelled through the vacuum port 29.

The specific quantity of micro-channel assemblies 34 are determined by application-specific requirements, such as fuel type, fuel temperature, and mass flow demand from the engine. Further, different fuels containing differing amounts of dissolved oxygen may require differing amounts of deoxygenation to remove a desired amount of dissolved oxygen.

Each fuel plate assembly 44 defines one fuel channel 38 (FIG. 3) between the inlet 26 and outlet 28 (FIG. 2A). The configuration of the fuel channel 38 is preferably defined to maximize fuel exposure to the composite oxygen permeable membrane 36 in order to maximize the amount of dissolved oxygen removed from the fuel. This may be accomplished by providing mixing and/or optimal flow patterns for the fuel. The fuel channels 38 are formed to maximize the amount of area of the fuel in contact with the permeable membrane in order to maximize the amount of dissolved oxygen removed from the fuel. The fuel channels 38 are preferably small enough that fuel is in contact with the composite oxygen permeable membrane 36 but also large enough so as to not restrict fuel flow.

Each fuel plate assembly 44 includes a first fuel plate 52, a second fuel plate 54, and a fuel plate gasket 56 therebetween. It should be understood that the fuel plate assembly 44 disclosed in the illustrative embodiment illustrates only two fuel plates and a gasket for the sake of clarity, it should be understood that any number of plates may be located between the outer housing plates 50a, 50b. Preferably, all of the plates between the outer housing plates 50a, 50b are non-metallic.

Each fuel plate assembly 44 includes a first fuel plate 52, a second fuel plate 54, and a fuel plate gasket 56 therebetween. The gasket 56 may be manufactured of a KAPTON® film manufactured by E. I. du Pont de Nemours and Company of Delaware USA. It should be understood that the fuel plate assembly 44 disclosed in the illustrative embodiment illustrates only two fuel plates and a gasket for the sake of clarity, it should be understood that any number of plate assemblies may be located between the outer housing plates 50a, 50b.

The first fuel plate 52 and the second fuel plate 54 are preferably manufactured of a non-metallic material such as a thermoplastic or a polyphenylene sulfide (PPS). It should be understood that other plastics that are compatible with fuel and are electrically conductive (to prevent static charge buildup) may alternatively be utilized as well as materials which are machined rather than molded.

Figure 2C:
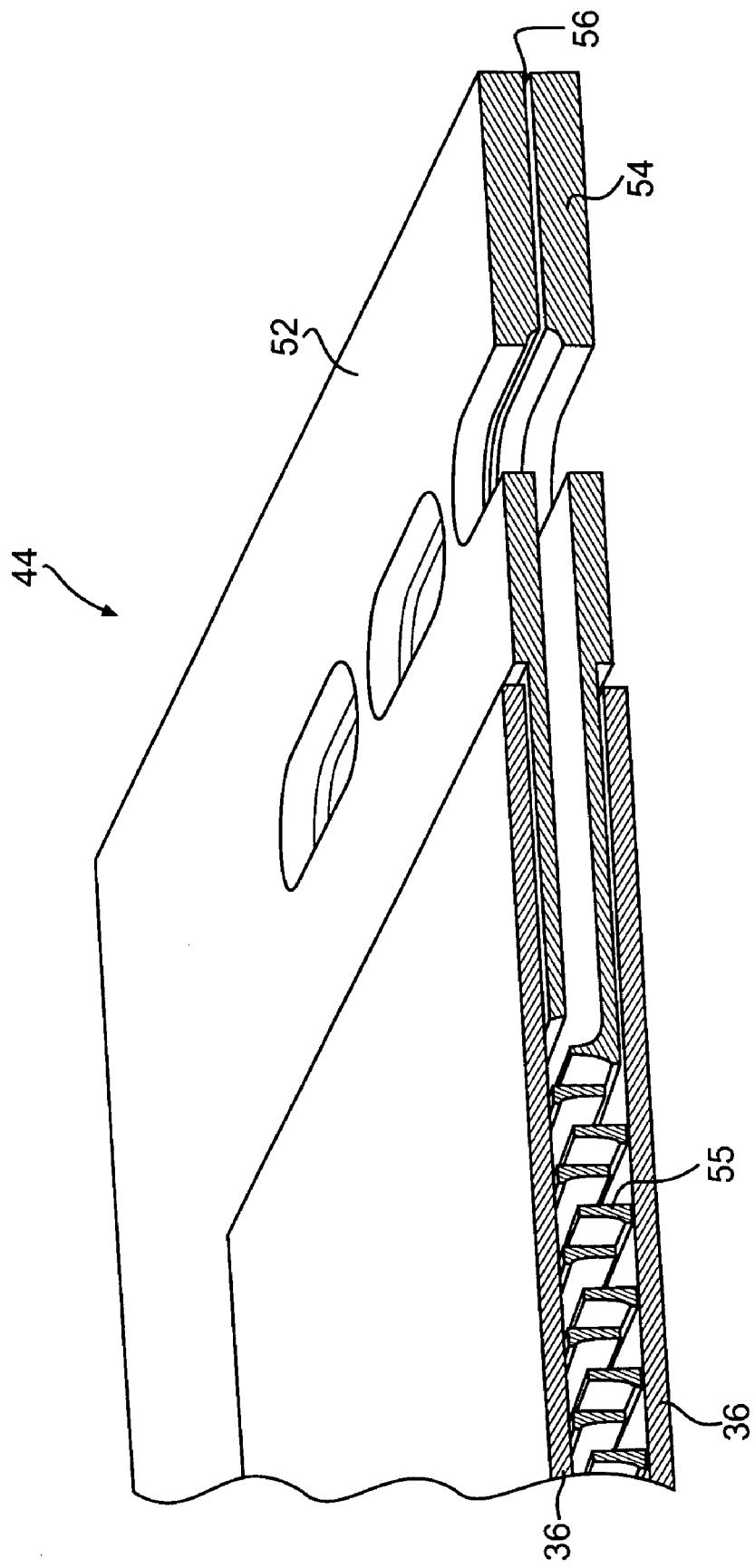
FIG. 2C is an expanded perspective view of a fuel plate assembly of the deoxygenator system of FIG. 2B.

The first fuel plate 52 and the second fuel plate 54 include flow impingement elements 55 (FIGS. 2C and 3) which increase oxygen diffusivity. When the fuel plates 52, 54 are assembled together, the flow impingement elements 55 are interleaved and alternate to provide the fuel channel 38 defined by the fuel plates 52, 54 with an intricate 3-dimensional flow characteristics (FIG. 3). In other words, the flow impingement elements 55 on each fuel plate 52, 54 extend above the planar surface of their respective fuel plates 52, 54. When the fuel plates 52, 54 are assembled together with the gasket 56 to form the fuel plate assembly 44, the flow impingement elements 55 form a complete fuel channel 38 in which the flow impingement elements 55 from adjacent fuel plates 52, 54 extend (FIG. 3).

The flow impingement elements 55 enhance deoxygenation by increasing transport of oxygen molecules to the oxygen permeable membrane surface, while the non-metallic material minimizes weight and sharp edges which may otherwise damage the oxygen permeable membranes 36. The flow impingement elements 55 of the deoxygenator system 14 enhance contact between fuel flow and the composite oxygen permeable membrane 36 to increase mass transport of dissolved oxygen.

Referring to FIG. 3, fuel flowing through the fuel channel 38 is in contact with the composite oxygen permeable membrane 36. Vacuum creates an oxygen partial pressure differential between the inner walls of the fuel channel 38 and the composite oxygen permeable membrane 36 which causes diffusion of oxygen dissolved within the fuel to migrate through the porous support 42 which supports the membrane 36 and out of the deoxygenator system 14 through the oxygen-receiving channel 40 separate from the fuel channel 38. For further understanding of other aspects of one membrane based fuel deoxygenator system and associated components thereof, attention is directed to U.S. Pat. No. 6,315,815 entitled Membrane based fuel deoxygenator; U.S. Pat. No. 6,939,392 entitled System and method for thermal management and U.S. Pat. No. 6,709,492 entitled PLANAR MEMBRANE DEOXYGENATOR which are assigned to the assignee of the instant invention and which are hereby incorporated herein in their entirety.

Figure 4:
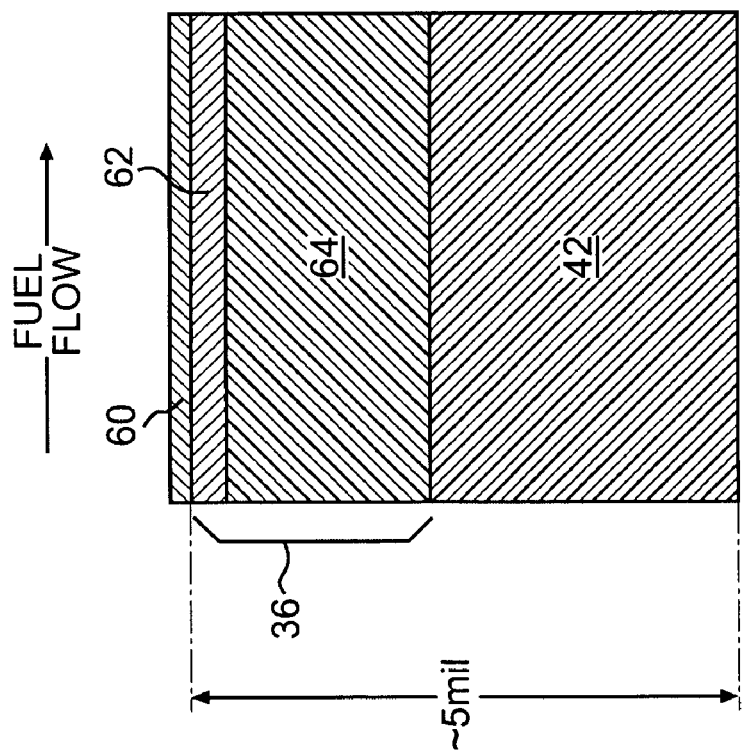
FIG. 4 is an expanded sectional view of the composite oxygen permeable porous membrane.

Referring to FIG. 4, the composite oxygen permeable membrane 36 is formed from a multiple of layers. Preferably, the layers include a sealant layer 60, an oxygen permeability layer 62 and a porous backing layer 64. The layered composite oxygen permeable membrane 36 maximizes the oxygen transfer rate and minimizes the fuel leakage rate to provide an efficient compromise based on product performance requirements. As the rate of fuel leakage through the membrane 36 is significantly lower than that of oxygen, the relatively thin sealant layer 60 has a dramatic impact in reducing the former without significantly affecting the latter.

The porous backing layer 64 is preferably an asymmetric porous substrate approximately two thousands of an inch thick. One such material is polyetherimide solution-cast by the method of phase inversion which provides skin pores on the order of approximately 40 nanometers such as that manufacture by Membrane Technology and Research, Inc. of Menlo Park, Calif. USA.

The porous backing layer 64 supports the oxygen permeability layer 62 such that the oxygen permeability layer 62 may be coated thereto and essentially bridge the skin pores thereof. The oxygen permeability layer 62 is preferably approximately 1-2 microns thick and is preferably manufactured of a polymer with high oxygen permeability such as TEFLON™ AF 2400.

The sealant layer 60 coats the oxygen permeability layer 62. The sealant layer 60 is preferably less than 1 micron thick and is preferably manufactured of an oxygen-permeable polymer with lower Free Fractional Volume (FFV), such as TEFLON™ AF 1600, HYFLON™ AD, etc., which provides fuel-resistant properties to the adjacent fuel flow.

The composite oxygen permeable membrane 36 is located adjacent the porous support 42 which provides stability to the composite oxygen permeable membrane 36 when sandwiched into the multiple of gas/fuel micro-channel assemblies 34 (FIG. 2B). Also, the porous support 42 provides a cushion between the porous backing layer 64 and the vacuum mesh which defines the oxygen-receiving channel 40 (FIG. 3). It should be understood that various flow through layers such as mesh, a honeycomb structure or other gaseous transfer channel structures may alternatively or additionally be utilized with the present invention.

Figure 5:
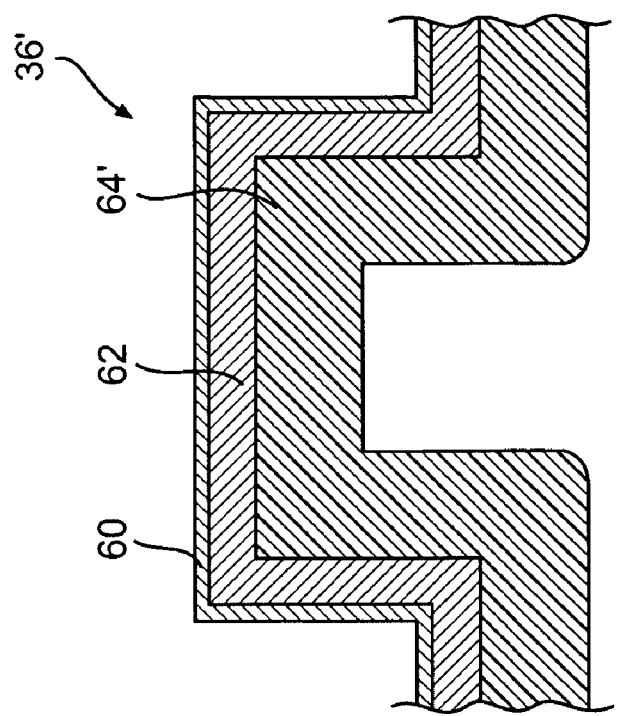
FIG. 5 is an expanded sectional view of a non-planar composite oxygen permeable porous membrane.

It should be understood that the composite oxygen permeable membrane 36 need not be a planar member and that various shapes of the porous backing layer 64' (FIG. 5) may be coated with the sealant layer 60 and oxygen permeability layer 62 to meet various packaging considerations; provide various flow characteristics as well as form various fuel channel 38 components.

Applicant has validated the composite oxygen permeable membrane 36 of the present invention experimentally as compared to conventional single layer membranes. In particular, a TEFLON™ AF 1600/TEFLON™ AF 2400 composite oxygen permeable membrane 36 as described above having a total thickness of approximately 2 microns exhibited a 20% improvement in jet fuel deoxygenation with only approximately 1/10 of the fuel leakage rate compared to an approximately 4 micron thick TEFLON ™ AF 2400 membrane with essentially no signs of performance degradation over 1000 hours of continuous operation.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fuel system comprising:
   a fuel channel;
   an oxygen receiving channel;
   a composite oxygen permeable membrane in communication with said fuel channel and said oxygen receiving channel, said composite oxygen permeable membrane includes a sealant layer on an oxygen permeability layer which is supported on a porous backing layer such that said sealant layer faces said fuel channel, said porous backing defines an asymmetric porous substrate which defines skin pores, said oxygen permeability layer briges said pores; and
   a porous support which supports said porous backing layer, said pores support thicker than said porous backing layer and manufactured of a material different than said porous backing layer.

2. The system as recited in claim 1, wherein said composite oxygen permeability layer is between 1-5 microns thick.

3. The system as recited in claim 1, wherein said composite oxygen permeability layer is approximately 1.5 microns thick.

4. The system as recited in claim 1, wherein said sealant layer is less than 1 microns thick.

5. The system as recited in claim 1, wherein said sealant layer is manufactured of Teflon AF1600.

6. The system as recited in claim 1, wherein said sealant layer is manufactured of HyflonAD.

7. The system as recited in claim 1, wherein said porous backing layer is approximately two thousands of an inch thick.

8. The system as recited in claim 1, further comprising a porous support which supports said porous backing layer; said porous support thicker than said porous backing and manufactured of a material different than said porous backing.

9. The system as recited in claim 1, wherein said asymmetric porous substrate is a polyetherimide solution-cast which defines skin pores on the order of approximately 40 nanometers.

10. The system as recited in claim 1, wherein said oxygen permeability layer is Teflon AF 2400.

11. A fuel system comprising:
    a fuel channel;
    an oxygen receiving channel;

a composite oxygen permeable membrane in communication with said fuel channel and said oxygen receiving channel, said composite oxygen permeable membrane includes a sealant layer on an oxygen permeability layer which is supported on a porous backing layer such that said sealant layer faces said fuel channel, said porous backing defines an asymmetric porous substrate which defines skin pores, said oxygen permeability layer approximately 1-2 microns thick and briges said skin pores; and a porous support which said porous backing layer, said porous support thicker than said porous backing layer and manufacture of a different than said porous backing layer.

12. The system as recited in claim 11 wherein said porous backing layer is approximately two thousands of an inch thick.

13. The system as recited in claim 12, wherein said asymmetric porous substrate is a polyetherimide solution-cast which defines skin pores on the order of approximately 40 nanometers.

14. The system as recited in claim 11, wherein said oxygen permeability layer is Teflon AF 2400.

15. The system as recited in claim 11, wherein said sealant layer coats said oxygen permeability layer.

16. A fuel system comprising:
a fuel channel;
an oxygen receiving channel;
a composite oxygen permeable membrane in communication with said fuel channel and said oxygen receiving channel, said composite oxygen permeable membrane includes a sealant layer on an oxygen permeability layer which is supported on a porous backing layer such that said sealant layer faces said fuel channel said sealant layer less than 1 micron thick, said porous backing defines an asymmetrical porous substrate which defines skin pores, said oxygen permeability layer bridges said skin pores; and a porous support which support said porous backing layer, said porous support thicker than said porous backing layer and manufactured of a material different than said porous backing layer.

17. The system as recited in claim 16 wherein said oxygen permeability layer is Teflon AF 2400.

18. The system as recited in claim 17, wherein said sealant layer coats said oxygen permeability layer.

19. The system as recited in claim 18, wherein said sealant layer is an oxygen-permeable polymer with fuel-resistant properties 20. The system as recited in claim 18, wherein said sealant layer is Teflon AF 1600.

21. The system as recited in claim 18, wherein said sealant layer is Hyflon AD.

22. The system as recited in claim 16, wherein said asymmetric porous substrate defines skin pores on the order of approximately 40 nanometers.

23. The system as recited in claim 1, wherein said porous support is manufactured of a non-woven polyester.

24. The system as recited in claim 1, wherein said composite oxygen permeability layer is manufactured of a polymer.

* * * * *

UNITED STATES PATENT AND TRADEMARK OFFICE
CERTIFICATE OF CORRECTION

PATENT NO. : 7,615,104 B2 Page 1 of 1
APPLICATION NO. : 11/265845
DATED : November 10, 2009
INVENTOR(S) : Cordatos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Nineteenth Day of October, 2010

David J. Kappos
*Director of the United States Patent and Trademark Office*